United States Patent [19]
Despointes

[11] Patent Number: 5,336,125
[45] Date of Patent: Aug. 9, 1994

[54] SKINNING APPARATUS

[75] Inventor: Simon H. Despointes, St. Vincent, St. West Indies

[73] Assignee: Embankment Investments Limited, Grand Cayman, Cayman Islands

[21] Appl. No.: 988,165

[22] Filed: Dec. 9, 1992

[30] Foreign Application Priority Data

Dec. 11, 1991 [GB] United Kingdom ............ 9126341

[51] Int. Cl.⁵ .................................... A22B 5/16
[52] U.S. Cl. ................................ 452/127; 452/136
[58] Field of Search ............ 452/127, 125, 135, 136, 452/134

[56] References Cited

U.S. PATENT DOCUMENTS

| | | |
|---|---|---|
| 1,376,810 | 5/1921 | Hieatzman . |
| 2,023,530 | 12/1935 | Kelly . |
| 2,578,952 | 12/1951 | Townsend . |
| 2,856,630 | 10/1958 | Lewis . |
| 3,094,739 | 6/1963 | Eriksen . |
| 3,149,923 | 9/1964 | Hughes . |
| 3,613,154 | 10/1971 | Townsend . |
| 4,606,093 | 8/1986 | Townsend . |
| 4,784,056 | 11/1988 | Townsend . |
| 4,793,026 | 12/1988 | Braeger et al. . |

FOREIGN PATENT DOCUMENTS

| | | |
|---|---|---|
| 925450 | 3/1955 | Fed. Rep. of Germany . |
| 1111960 | 3/1956 | France . |
| 2443209 | 7/1980 | France . |
| 77233 | 7/1950 | Norway . |
| 741799 | 12/1955 | United Kingdom . |
| 1401567 | 7/1975 | United Kingdom . |

*Primary Examiner*—Willis Little
*Attorney, Agent, or Firm*—Kane, Dalsimer, Sullivan, Kurucz, Levy, Eisele & Richard

[57] ABSTRACT

A skinning machine for removing a layer of predetermined thickness from a body. The skinning machine comprising a downwardly sloping first table with feeding means to feed the body to a cutting station where a blade removes the layer from the body and a discharge station.

16 Claims, 5 Drawing Sheets

SKINNING APPARATUS

BACKGROUND TO THE INVENTION

A. Field of Invention

This invention relates to skinning apparatus for removing a layer from a body, and particularly but not exclusively, relates to skinning apparatus for removing the skin from a fish.

B. Description of the Prior Art

One known method of removing the skin from a fish is simply to tear it off, either manually or by machine, The known tearing machines have a tendency to damage the body of the fish and also to leave on them some greyish nerves which can interfere with further processing and, above all, look unsightly which reduces the acceptability of the fish to the customer.

It is also known to remove the skin manually with a knife but this is a time consuming, and inevitably expensive, procedure.

OBJECTIVES AND SUMMARY OF THE INVENTION

One object of the present invention is to provide a machine for skinning fish which overcomes the disadvantages of the known machines and is also simple to operate and economical to construct and maintain.

A further object of the invention is to provide skinning apparatus that can remove a layer of substantially a predetermined thickness from the body.

According to the present invention there is provided skinning apparatus adapted to remove a layer from a body, the apparatus comprising a generally planar support surface, feeding means for feeding the body along said support surface to a skinning station, the skinning station having a cutting means having a cutting edge to cut a layer from the body and a diverter means to separate the layer so removed from the remainder of the body.

Preferably, the support surface comprises an elongate table and the cutting means comprising a reciprocating blade extending transversely across the table. Preferably, a slot may be provided between two sections of table, immediately below the cutting blade to enable the layer, which typically comprises the skin of a fish fillet, to be diverted below the table, the skinned fish fillet remaining on the table and passing to a discharge zone.

BRIEF DESCRIPTION OF THE DRAWINGS

Preferred embodiments of skinning apparatus in accordance with the present invention will now be described by way of example with reference to the accompanying informal drawings in which.

DETAILED DESCRIPTION OF THE INVENTION

Figure 1:
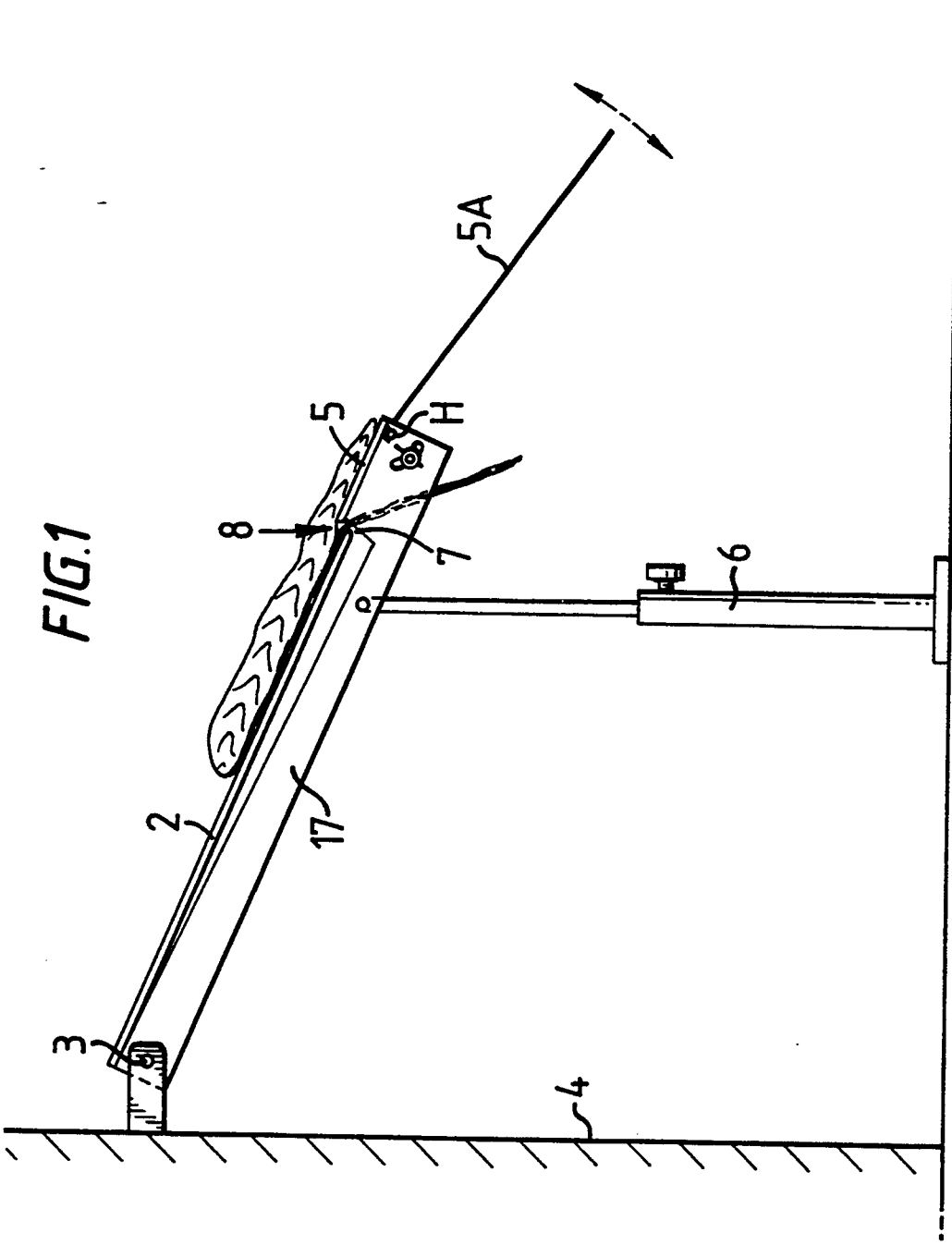
FIG. 1 shows a schematic side view of the skinning apparatus.

Referring now to FIG. 1, there is shown, in schematic form, a side view of a skinning machine adapted to remove the skin from fish. The apparatus comprises a two part table 1 having two table 2, 5 mounted on a frame 17 and comprising an upper table 2 attached, preferably by welding, to the frame 17 which is pivotably mounted on a bracket 3 attached to a wall 4 or other support. The frame 17 is supported on an adjustable support system 6 which enables the height of the free end of the frame 17, and hence the height and degree of inclination of the two tables 2 and 5 to be adjusted. Between the two tables 2 and 5, there is a slot 7 through which the skin passes after it is removed from the fish.

The two tables 2 and 5 are inclined at an angle which provides a means for downwardly feeding by means of gravity fish which are placed on the upper table 2 to a skinning station 8. The cutting station 8 is provided in the region of the junction between the two tables 2 and 5. After the removal of the skin from the fish, the fish does not slide as easily over the table 5. In order to ensure that the skinned fish slides away from the cutting station 8, the table 5 is provided with a lower hinged portion 5a which can be set at a predetermined angle to the vertical independently of the frame 17. Therefore, if the angle of the lower portion is set to incline more steeply than the rest of the table 2, 5, then the gravitational effect on the skinned fish will be increased and the skinned fish will slide more easily over the surface.

Figure 3:
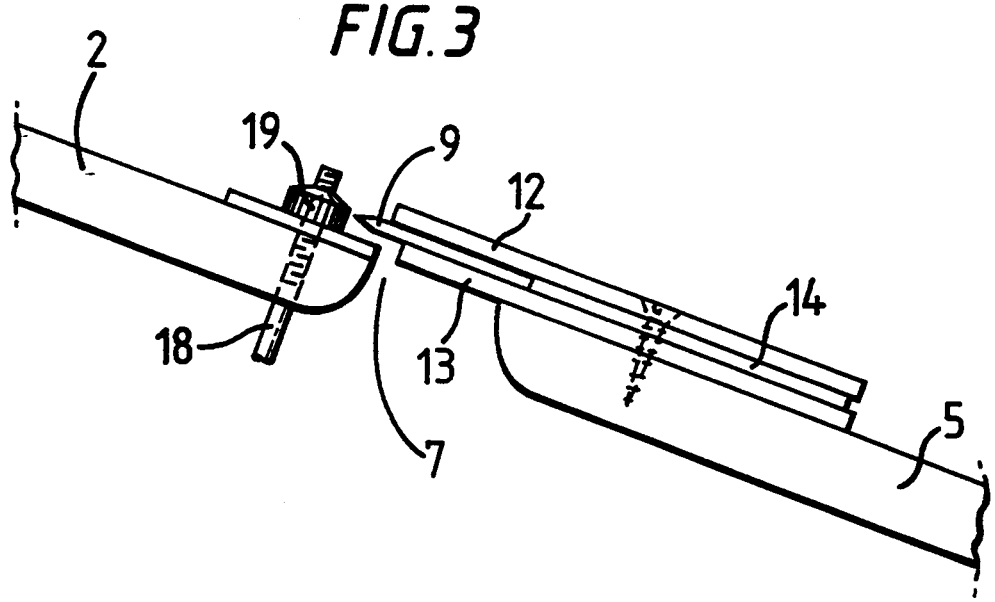
FIG. 3 shows a side view of the cutting station.
Figure 4:
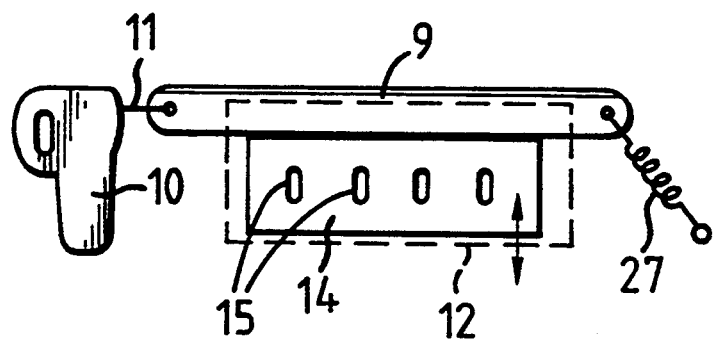
FIG. 4 shows schematically a plan view of the cutting station.

Referring now to FIG. 3 and FIG. 4 also, in the skinning station 8 there is a transverse elongate cutting blade 9 which is reciprocated along its longitudinal axis by means of a electric motor 10 to which the blade is connected by a quick release connection 11. The cutting blade 9 is mounted between an upper stainless steel strip 12 and a lower stainless steel strip 13. An adjustable stainless steel strip 14 is sandwiched between the strips 12 and 13 and serves as an abutment for the rear face of the blade 9. The blade 9 is urged into engagement with the strip 14 by a spring 27. This method of mounting the blade enables the blade to be changed, when worn, very quickly and easily.

The adjustable strip 14 has a plurality of elongated holes 15 by which it is secured to the table 5. By suitably adjusting the position of the strip 14, the amount by which the blade projects from the strips 12 and 13, and its relationship with respect to the slot 7 between the upper and lower tables 2 and 5, is adjustable.

Figure 2:
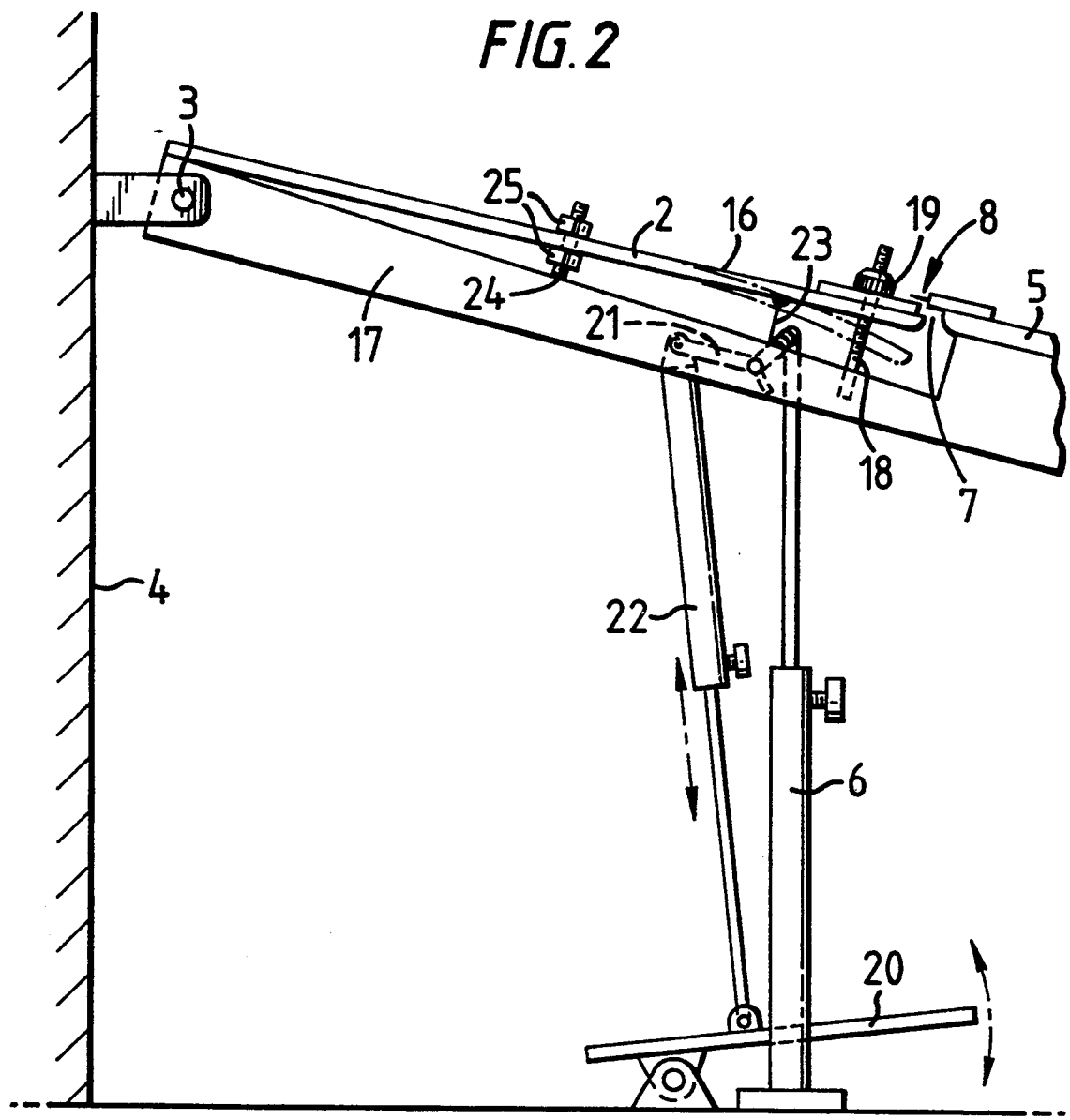
FIG. 2 shows a side view of part of the apparatus to a greater scale.

Referring now to FIG. 2, the upper table 2 is mounted on the frame 17 in an adjustable manner so that the position of the plane of its supporting surface 16 relative to the plane of the surface of the lower table 5 can be varied to adjust the relative height between the two table 2, 5.

The position of the upper table 2 is determined by bolts 24 located on the frame on each side of the table, and locknuts 25 fastened on the bolts 24. The cutting blade 9 is mounted on the lower table 5 and therefore by adjusting the relative height of the surface of the table 2 relative to the table 5 and hence the cutting blade 9, the thickness of the slice removed from a fish on the table 2 can be adjusted. The table height adjusting mechanism consists of a bolts 18 located on each side of the table 2, although only one is shown, with a locking nut 19 mounted on each bolt 18. This limits the upward movement of the table and, in cooperation with the position of the locknuts 25 determines the initial position of the table. The upper table 2 is connected to a pedal 20 through a connecting rod 22 and a lever arrangement 21. The lever arrangement 21 is connected to the table by a nylon cord 23 which is wrapped round a shaft on the linkage 21. Depressing the front of pedal 20, lowers the table 2 adjacent the slot by using the inherent resilience of the table 2 flexing about the locknuts 25 as shown in dotted outline. This allows the introduction of the skin of the fillet to be skinned into the slot 7. Alternatively, resilient means, which may be a spring or weight, are provided to bias the table 2 upwardly into abutment with the nuts 19. Depressing the back of pedal 20 causes the connecting rod 22 to move upwards, which activates a switch (not shown) which switch is adapted to prevent the actuation of the electric motor 10 when the end of the table 2 adjacent to the slot is lowered. In a modification of the mounting means the adjustable support means 6 is connected to the shaft of the lever arrangement 21.

Figure 5:
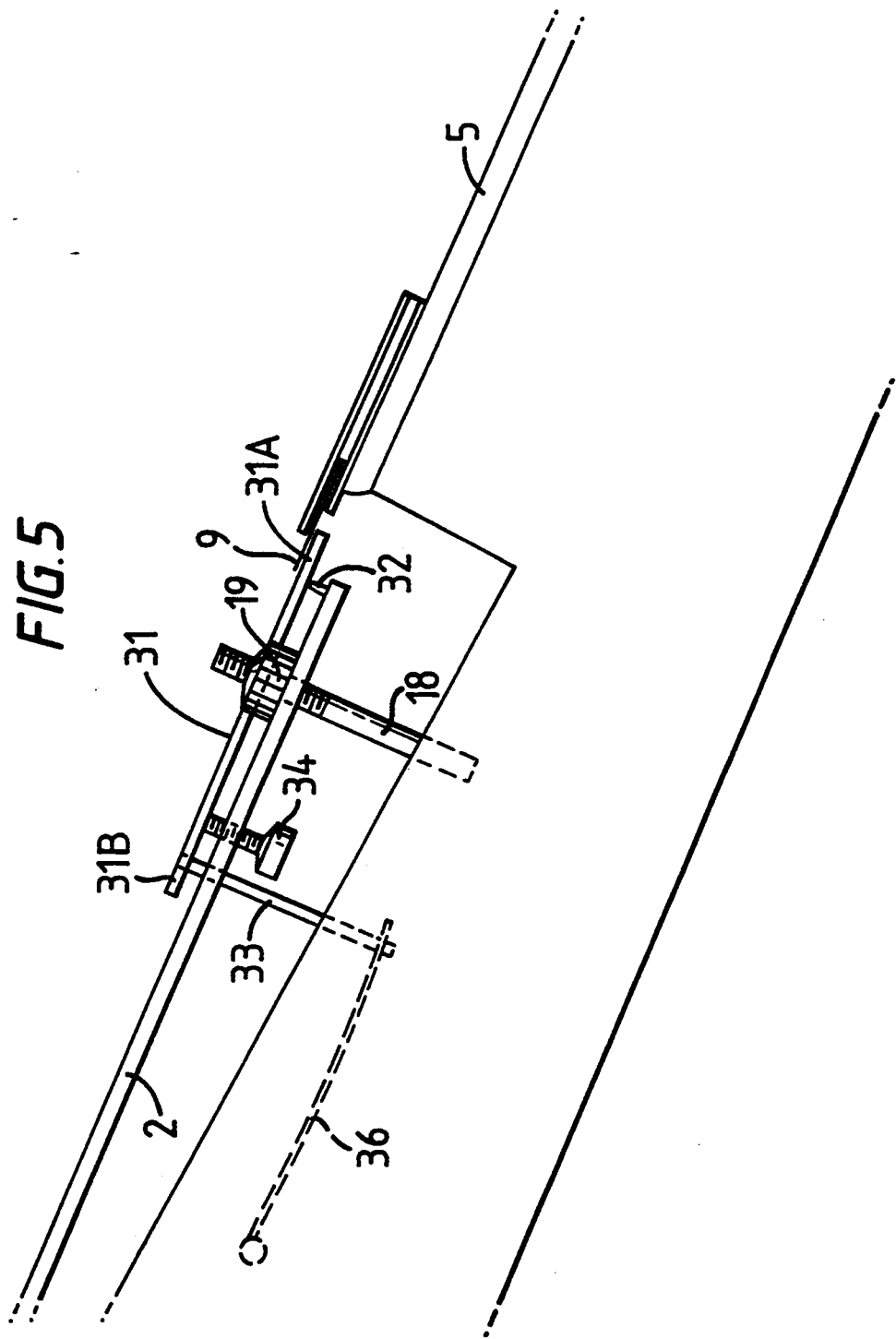
FIG. 5 shows a side view of part of a second embodiment of the apparatus.
Figure 6:
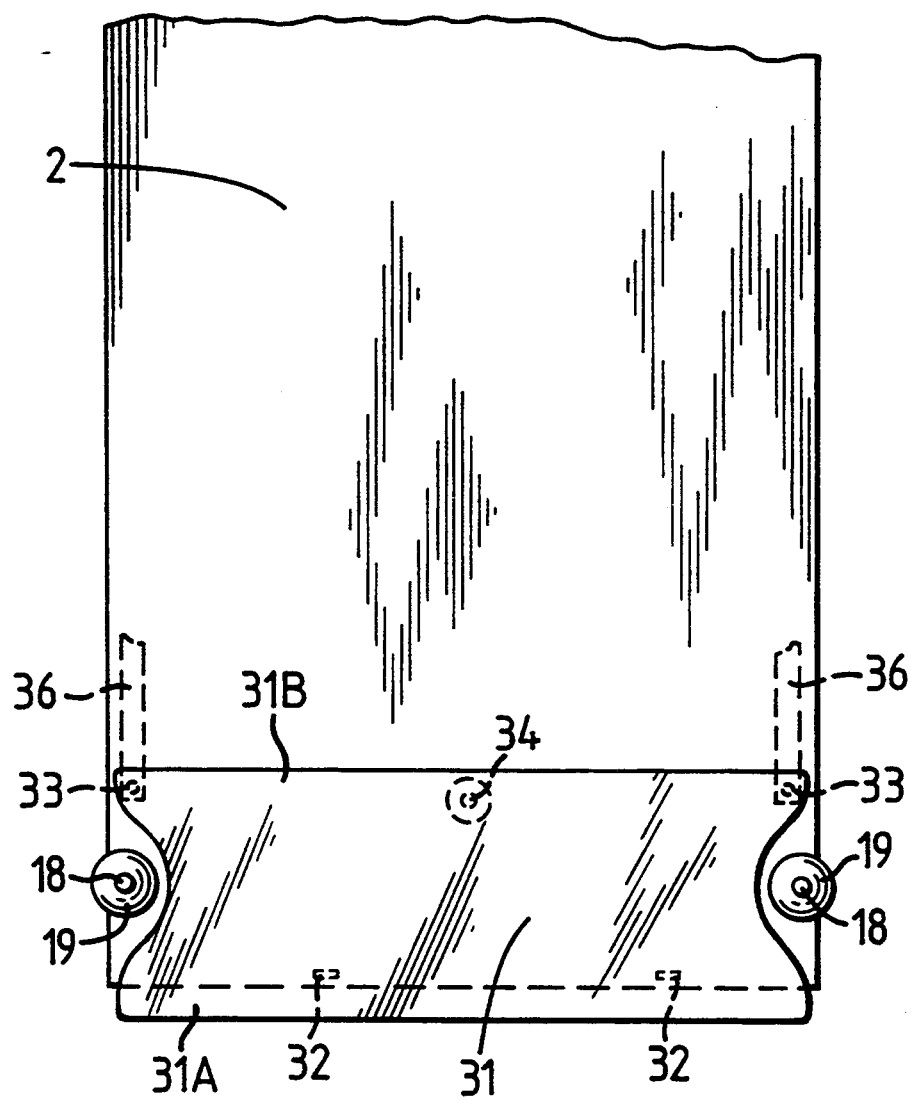
FIG. 6 shows a top view of the part of the apparatus in FIG. 5.

In a second embodiment shown in FIGS. 5 and 6, the upper table 2 is provided with an adjustment plate 31 in the region of the slot 7, so that the upper surface of the plate 31 acts as the supporting surface 16. The plate 31 is pivotable about the transverse direction of the table on pivot means 32 adjacent the slot 7. The plate 31 is secured to resilient fixing means 33 adjacent to the end 31B of the plate 31 furthest from the slot 7. A gap adjustment means 34 in the form of an adjustable screw is provided adjacent to the fixing means 33. The gap adjustment means 34 limits the movement of the end 31B towards the upper table 2 and thereby determines the minimum distance of the end 31A from the cutting means 9. The gap adjustment means 34 is adjustable to alter said minimum distance and to adjust the orientation of the surface relative to the cutting blade 9. The resilient fixing means 33 includes spring means 36 to bias the end 31B towards the support surface 16 of the upper table 2 and so the end 31B rests against gap adjustment means 34 when the apparatus is in an equilibrium position.

In a third embodiment, not shown, the gap adjustment means 34 comprises the locking nuts 19 and bolts 18 and the resilient fixing means comprise part 20, 21, 22, 23. The end 31 B is squeezed between the lock nuts 19 and bolts 18.

In operation, a fish fillet to be skinned is placed on the upper table 2 where it is carried by gravity down to the skinning station 8. When using embodiments of this invention not having the plate 31, certain kinds of fish, such as the King fish, have a protuberance near their tail which hinders the start of skinning operation and so, prior to placing such fish on the upper table 2, the leading end of the fish is treated manually to sever the first part of the skin from the main body of the fish. However, this is not normally necessary in the embodiment shown in FIGS. 3 and 4.

The other embodiments operate in similar fashion except that the adjustment plate allows the thickness of the slice to increase for a limited period during operation in the case of an abnormality on the surface of the fish fillet, but due to the resilient biasing of the plate 31 the thickness will be returned to the preferred thickness as set by the gap adjustment means.

As the fish fillet is fed into the skinning station 8, the leading end of the skin of the fish, which as explained, may or may not be already severed passes through the slot 7 between the two tables, or is offered up to the cutting blade 9. From this position, the electric motor 10 is started, to reciprocate the blade 9, and by gently pulling on the skin from below the conveyor, the fish is drawn through the cutting station by the operator to pass down onto the lower table 5. Manually pulling on the skin assists the gravitational effect which also helps to transport the fish fillet through the cutting station. Alternatively, the manual pulling can be replaced by a mechanical arrangement for pulling the fish, such as pinch rollers and a roller conveyor.

In a further embodiment, not shown, sensors may be provided that determine the thickness of the slice during operation either continually or at predetermined intervals. Means are provided to reset the gap adjustment means 34 depending on the required thickness, so that the minimum distance can be altered during the slicing operation of each fish fillet.

In all the above embodiments a rotary or stationary blade could be used.

I claim:

1. Skinning apparatus adapted to remove a layer from a body, the apparatus comprising a generally planar support surface, feeding means for feeding the body along said support surface to a skinning station, the skinning station having a cutting means having a cutting edge to cut a layer from the body and a diverter means to separate the layer so removed from the remainder of the body and wherein the support surface comprises a first table means and a second table means spaced therefrom to form a slot therebetween, the diverter means includes the slot, and the cutting edge extends generally parallel to and adjacent the slot and wherein said first and second table means are supported on a frame, and height setting means are provided to enable the setting of a predetermined relative height between the end of the first table means and the cutting edge, and wherein the first table means in resilient.

2. Skinning apparatus according to claim 1, wherein the said predetermined relative height is adapted to be increased by introduction means.

3. Skinning apparatus according to claim 2, further including return means to return the relative height from the increased relative height to the said predetermined relative height.

4. Skinning apparatus according to claim 3 wherein the introduction means is connected to said first table means and the return means comprises the resilience of the first table means.

5. Skinning apparatus according to claim 4, wherein the first table means includes an adjustment plate to adjust the orientation of the support surface relative to the cutting edge.

6. Skinning apparatus according to claim 5, wherein pivot means are provided to pivotably mount the adjustment plate on the first table means adjacent the slot, and resilience means are provided to resiliently bias an edge of an adjustment plate towards the cutting edge.

7. Skinning apparatus according to claim 6, the adjustment plate includes a gap adjustment means to limit the pivotable movement of the plate towards the cutting edge.

8. Skinning apparatus according to claim 7, wherein the gap adjustment means is ad justable to alter the distance of said edge between the adjustment plate to the cutting edge.

9. Skinning apparatus according to claim 8, wherein the support surface along which the body is fed to the skinning station is inclined downwardly at an angle to the vertical, and the feeding means comprises gravity.

10. Skinning apparatus according to claim 9, wherein the cutting means and diverter means includes a reciprocating blade extending transversely across the surface.

11. A skinning apparatus adapted to remove a layer from a body, the apparatus comprising a generally planar support surface, feeding means for feeding the body along said support surface to a skinning station, the skinning station having a cutting means having a cutting edge to cut a layer from the body and a diverter means to separate the layer so removed from the remainder of the body, wherein the support surface comprises a first table means and a second table means spaced therefrom to form a slot therebetween, the diverter means includes the slot, and the cutting edge extends generally parallel to and adjacent to the slot, the said first and second table means being supported on a frame and height setting means are provided to enable the setting of a predetermined relative height between the end of the first table means and the cutting edge, wherein the first table includes an adjustment plate to adjust the orientation of the support surface relative to the cutting edge.

12. Skinning apparatus according to claim 11, wherein pivot means are provided to pivotably mount the adjustment plate on the first table means adjacent the slot, and resilience means are provided to resiliently bias an edge of the adjustment plate towards the cutting edge.

13. Skinning apparatus according to claim 12, the adjustment plate includes a gap adjustment means to limit the pivotable movement of the plate towards the cutting edge.

14. Skinning apparatus according to claim 13, wherein the gap adjustment means is adjustable to alter the distance between said edge of the adjustment plate to the cutting edge.

15. Skinning apparatus according to claim 14, wherein the support surface along which the body is fed to the skinning station is inclined downwardly at an angle to the vertical, and the feeding means comprises gravity.

16. Skinning apparatus according to claim 15, wherein the support surface comprises an elongate element, the cutting means and diverter means includes a reciprocating blade extending transversely across the surface.

* * * * *